US012706083B2

(12) United States Patent
King et al.

(10) Patent No.: US 12,706,083 B2
(45) Date of Patent: Aug. 11, 2026

(54) DYNAMIC TRANSLATION RELAY SYSTEM

(71) Applicant: T-Mobile USA, Inc., Bellevue, WA (US)

(72) Inventors: Willie King, Austin, TX (US); Heather Wensler Nolis, Renton, WA (US); Mark Alan Tauscher, Phoenix, AZ (US)

(73) Assignee: T-Mobile USA, Inc., Bellevue, WA (US)

( * ) Notice: Subject to any disclaimer, the term of this patent is extended or adjusted under 35 U.S.C. 154(b) by 140 days.

(21) Appl. No.: 18/680,357

(22) Filed: May 31, 2024

(65) Prior Publication Data

US 2025/0372077 A1 Dec. 4, 2025

(51) Int. Cl.
*G10L 15/26* (2006.01)
*G10L 13/033* (2013.01)
*G10L 13/08* (2013.01)

(52) U.S. Cl.
CPC ............ *G10L 13/08* (2013.01); *G10L 13/033* (2013.01)

(58) Field of Classification Search
None
See application file for complete search history.

(56) References Cited

U.S. PATENT DOCUMENTS 6,539,354 B1 3/2003 Sutton et al.
6,658,389 B1 12/2003 Alpdemir
7,174,295 B1 2/2007 Kivimäki
7,636,662 B2 12/2009 Dimtrova et al.
8,224,652 B2 7/2012 Wang et al.
8,447,610 B2 5/2013 Meyer et al.
8,515,749 B2 8/2013 Stallard
8,886,537 B2 11/2014 Goldberg et al.
8,886,538 B2 11/2014 Aaron et al.
8,954,456 B1 * 2/2015 Pierce .................. G06F 16/258 707/694
9,286,886 B2 3/2016 Minnis et al.

(Continued)

FOREIGN PATENT DOCUMENTS

CN 106550156 A 3/2017
CN 108877766 A 11/2018

(Continued)

*Primary Examiner* — Neeraj Sharma
(74) *Attorney, Agent, or Firm* — Ashurst Perkins Coie US LLP

(57) ABSTRACT

The technology is directed to a system that enhances input(s) received from a device. The system analyzes the input to extract features such as acoustic properties and expressive parameters. The system upscales the input based on the extracted features and translates the enhanced audio into text while maintaining the original context and satisfying predetermined language guidelines. The system generates synthesized speech that preserves the context of the original input and presents the synthesized speech via a speaker of the device. The system can process communications containing hybrid multimodal inputs by identifying the communication mode of each input and extracting contextual features from the multimodal inputs. The system generates a message for communication by translating the extracted contextual features into a predefined communication format and presents the message via the device.

20 Claims, 9 Drawing Sheets

(56) References Cited

U.S. PATENT DOCUMENTS 9,570,066 B2 2/2017 Talwar et al.
9,583,106 B1 2/2017 Zetterberg
9,620,105 B2 4/2017 Mason
9,666,180 B2 5/2017 Paquier et al.
9,812,123 B1 11/2017 Sanders et al.
9,922,641 B1 * 3/2018 Chun ...................... G10L 15/07
9,953,638 B2 4/2018 Willett et al.
10,026,393 B2 7/2018 Christian et al.
10,074,359 B2 9/2018 Silveira Ocampo
10,089,974 B2 10/2018 Zhao et al.
10,147,416 B2 12/2018 Sabbavarapu et al.
10,249,289 B2 4/2019 Chun et al.
10,331,983 B1 6/2019 Yang et al.
10,341,461 B2 7/2019 Moon et al.
10,706,329 B2 7/2020 Anushiravani et al.
10,755,718 B2 8/2020 Ge et al.
11,049,490 B2 6/2021 Deng et al.
11,151,385 B2 10/2021 Iyer et al.
11,164,105 B2 11/2021 Sankaran et al.
11,195,507 B2 12/2021 Kumar et al.
11,256,882 B1 * 2/2022 Waibel .................. G06F 40/166
11,295,721 B2 4/2022 Gururani et al.
11,315,040 B2 4/2022 Nadimpalli et al.
11,322,133 B2 5/2022 Shekhar et al.
11,341,986 B2 5/2022 Faizakof et al.
11,545,134 B1 * 1/2023 Federico ............... G10L 13/033
11,567,476 B2 1/2023 Cocciadiferro
11,605,374 B2 3/2023 Kim et al.
11,611,554 B2 3/2023 Tagra et al.
11,676,572 B2 6/2023 Peddinti et al.
11,688,509 B2 6/2023 Hanson et al.
11,715,457 B1 8/2023 Golman et al.
11,727,914 B2 8/2023 Zhao et al.
11,823,060 B2 11/2023 Antic
11,830,473 B2 11/2023 Monge Alvarez et al.
11,848,008 B2 12/2023 Chen et al.
11,848,011 B1 * 12/2023 Fantinuoli ............... G10L 25/48
11,972,226 B2 * 4/2024 Padfield .................. G10L 15/22
12,205,614 B1 * 1/2025 Sharma ................... G10L 25/30
2002/0128838 A1 9/2002 Veprek
2003/0040903 A1 2/2003 Gerson
2003/0236663 A1 12/2003 Dimitrova et al.
2004/0024585 A1 2/2004 Srivastava et al.
2005/0102135 A1 5/2005 Goronzy et al.
2009/0258333 A1 10/2009 Yu et al.
2010/0100382 A1 4/2010 Rao et al.
2010/0198577 A1 * 8/2010 Chen ..................... G10L 15/187
704/2
2011/0178791 A1 * 7/2011 Stymne ................... G06F 40/44
704/2
2013/0013302 A1 1/2013 Roberts
2013/0070928 A1 3/2013 Ellis et al.
2013/0132079 A1 5/2013 Sehgal et al.
2013/0158992 A1 6/2013 Lin
2014/0025382 A1 1/2014 Chen et al.
2016/0365087 A1 12/2016 Freud
2016/0379106 A1 12/2016 Qi et al.
2018/0247636 A1 8/2018 Arik et al.
2018/0336880 A1 11/2018 Arik et al.
2019/0019497 A1 1/2019 Shin et al.
2020/0356725 A1 11/2020 Okonkwo et al.
2021/0027784 A1 * 1/2021 Li ........................... G10L 15/26
2021/0397311 A1 12/2021 Soini
2022/0012436 A1 * 1/2022 Park ........................ G06F 40/58
2022/0027611 A1 1/2022 Yu et al.
2022/0092276 A1 3/2022 Tu et al.
2022/0223066 A1 7/2022 Chen et al.
2022/0392430 A1 12/2022 Kilgore et al.
2023/0177820 A1 6/2023 Zhang et al.
2023/0252295 A1 8/2023 Li et al.
2023/0360557 A1 11/2023 Balakrishnan et al.
2023/0368080 A1 11/2023 Jha et al.
2023/0377724 A1 11/2023 Vazquez Romaguera et al.
2023/0414189 A1 12/2023 Saeed et al.
2024/0062064 A1 2/2024 Puzovic et al.
2024/0331681 A1 * 10/2024 Iyer ....................... G10L 13/033

FOREIGN PATENT DOCUMENTS

CN 109410911 A 3/2019
CN 110110707 A 8/2019
CN 111145786 A 5/2020
CN 111179910 A 5/2020
CN 106782501 B 7/2020
CN 106920545 B 7/2020
CN 111429946 A 7/2020
CN 108109613 B 8/2020
CN 108091323 B 10/2020
CN 111882362 A 11/2020
CN 111966212 A 11/2020
CN 112201228 A 1/2021
CN 112908300 A 6/2021
CN 113012715 A 6/2021
CN 111507115 B 7/2021
CN 113168438 A 7/2021
CN 110209789 B 8/2021
CN 113257220 B 11/2021
CN 113744755 A 12/2021
CN 113808572 A 12/2021
CN 113836507 A 12/2021
CN 113920980 A 1/2022
CN 111681636 B 2/2022
CN 111862934 B 9/2022
CN 110598739 B 6/2023
CN 115983280 B 8/2023
CN 111144554 B 9/2023
CN 113345413 B 12/2023
CN 112786007 B 1/2024
EP 2929461 A2 10/2015
EP 3109856 A1 12/2016
EP 3144929 A1 3/2017
EP 3350806 A1 7/2018
EP 3642834 A1 4/2020
EP 3752899 A1 12/2020
EP 3782092 A1 2/2021
EP 3839818 A2 6/2021
EP 3892185 A1 10/2021
EP 3602545 B1 11/2021
EP 4033432 A1 7/2022
EP 3824461 B1 8/2022
JP WO2008001500 A1 11/2009
JP 2014123072 A 7/2014
JP 6002704 B2 9/2016
JP 2020503570 A 1/2020
JP 2020038603 A 3/2020
JP 6926241 B2 8/2021
KR 100220960 B1 9/1999
KR 101203188 B1 11/2012
KR 101221188 B1 1/2013
KR 101480668 B1 1/2015
KR 101611224 B1 4/2016
KR 20170105365 A 9/2017
KR 102121059 B1 6/2020
KR 20200132645 A 11/2020
KR 20210081166 A 7/2021
KR 102340486 B1 12/2021
KR 102472971 B1 12/2022
WO 2018057269 A1 3/2018
WO 2018087764 A1 5/2018
WO 2018195307 A1 10/2018
WO 2018212861 A1 11/2018
WO 2020096889 A1 5/2020
WO 2021027029 A1 2/2021
WO 2021042517 A1 3/2021
WO 2021052875 A1 3/2021
WO 2021217340 A1 11/2021

* cited by examiner

DYNAMIC TRANSLATION RELAY SYSTEM

BACKGROUND

Speech synthesis refers to the artificial production of human speech. A conventional speech synthesizer can be implemented in software and/or hardware products. A traditional text-to-speech system converts normal language text into speech; other systems render symbolic linguistic representations like phonetic transcriptions into speech. A traditional text-to-speech system converts raw text containing symbols such as numbers and abbreviations into the equivalent of written-out words, assigns phonetic transcriptions to each word, and divides and marks the text into prosodic units, such as phrases, clauses, and sentences. The synthesizer converts the symbolic linguistic representation into sound. On the other hand, speech recognition, also known as automatic speech recognition or speech-to-text, recognizes and translates spoken language into text by computers.

Acoustic phonetics describe and classify speech sounds based on the sounds' acoustic properties. The sounds' acoustic properties include distinctive acoustic cues that differentiate one speech sound from another, such as formant frequencies (e.g., resonant frequencies produced by the vocal tract during speech). Further, acoustic properties also include the temporal organization of speech, such as patterns of speech rhythm, timing, and prosody. However, a traditional text-to-speech system can sometimes lack the ability to capture the nuanced variations in speech dynamics (e.g., subtle shifts in intonation, emphasis, and emotion) and thereby struggle to convey the natural rhythm and cadence of human speech, leading to a synthesized output that sounds robotic or unnatural to listeners.

BRIEF DESCRIPTION OF THE DRAWINGS

Detailed descriptions of implementations of the present invention will be described and explained through the use of the accompanying drawings.

Figure 1:
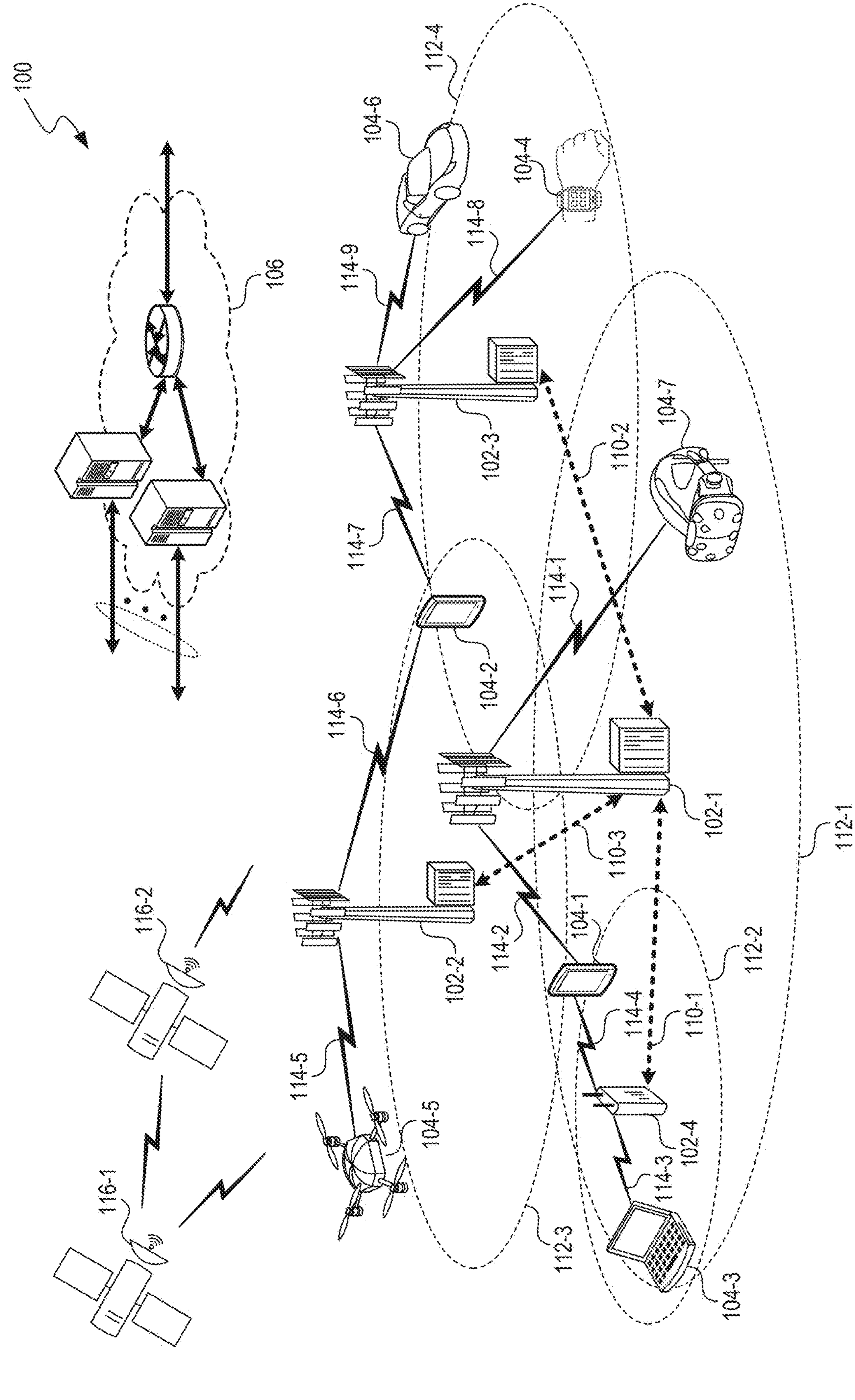
FIG. 1 is a block diagram that illustrates a wireless communications system that can implement aspects of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional communication methods can fail to provide adequate support for communications using multiple modalities such as verbalizations, text, and gestures. This limitation poses significant challenges, particularly for individuals with disabilities who rely on diverse communication methods to express themselves effectively. Moreover, existing communication systems lack the flexibility and adaptability needed to integrate various modes of communication into a single cohesive translated message that captures the user's original context in real-time. As a result, individuals who use traditional multimodal communication systems face barriers in effectively conveying messages and participating in various social and professional interactions. For example, a user can use gestures and/or written text to supplement their speech. The integration of multiple modalities-verbalization, gestures, and written text-enhances the overall expressiveness of the communication. However, using a conventional system, a user may be unable to combine the different modalities into a single mode (e.g., verbalization) that accurately, in real-time, encompasses the expressive qualities of all the multimodal inputs.

Moreover, existing speech-to-speech and text-to-speech systems are sometimes unable to accurately interpret and convey the nuanced expressive qualities embedded within user inputs, hindering the accurate conveyance of emotions, intentions, and emphasis during communication sessions. Additionally, existing systems are unable to refine a user's communication to account for factors such as grammatical errors. For example, the verbalization of an individual attempting to convey an idea during a video conference can include irregular pauses, slurred words, or difficulty pronouncing certain sounds. As a result, the spoken sentences might lack grammatical accuracy or coherence, leading to potential misunderstandings. Without relevant support or accommodations, such as real-time transcription, the individual can be unable to effectively communicate their message.

This document discloses methods, apparatuses, and systems that provide dynamic translations of input (e.g., audio, text, gesture) from users during communication sessions between the users. The disclosed technology addresses the lack of real-time communication systems tailored to meet the diverse communication needs of individuals, such as those with speech disabilities or varying communication preferences. In some implementations, an audio device such as a smartphone receives audio input from a user. A computer system extracts relevant features of the audio input (e.g., acoustic properties and/or expressive parameters). The acoustic properties, in some implementations, differentiate between portions of the audio input, including characteristics such as pitch, duration, timbre, and spectral properties. Meanwhile, the expressive parameters serve as cues for identifiable emotions in the audio input, including intonation, pitch variation, tempo, and prosodic elements. The system upscales the audio input based on the extracted features to amplify portions of the audio and enhance overall clarity and intelligibility. The system can generate a text translation of the upscaled audio input. The text translation can be modified to satisfy predetermined language guidelines (e.g., ensuring correct grammatical structures).

Once the text translation is modified, the system generates synthesized speech directed by the expressive parameters identified in the input. The synthesized speech preserves the context of the original input and emulates the identifiable emotions present in the original input. For example, if the expressive parameters show that the speaker is angry, the synthesized speech will present the anger by adjusting the audio features accordingly. In some implementations, the expressive parameters are configurable by the user of the relay system, allowing for personalized adjustments. The synthesized speech is presented via a speaker of the device for user consumption.

The systems disclosed herein can process hybrid multimodal inputs, which refer to inputs that combine multiple communication modes simultaneously. For example, a computer system receives multimodal inputs including one or more communication modes, such as audio, text, and/or gestures. Upon obtaining the multimodal inputs, the system identifies the communication mode of each input (e.g., audio, text, or gesture) and extracts contextual features from the multimodal inputs using an extraction module. The contextual features characterize each input and guide the system in dynamically switching between artificial intelligence (AI) models based on the communication mode detected. Additionally, in some implementations, the system can dynamically adjust the obtained inputs based on the inputs' relevance to the communication and create user profiles incorporating preferences based on previous interactions. Once the communication mode is identified, the system generates a translated message for the communication by translating the extracted contextual features into a predefined communication format. The format can include text, audio, gestures, or a combination thereof. The translated message is presented via the device (e.g., via a speaker in the audio device).

Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "402") can implement components, operations, or structures (e.g., "402") described as a single instance. Further, plural instances (e.g., "402") refer collectively to a set of components, operations, or structures (e.g., "402") described as a single instance. The description of a single component (e.g., "402") applies equally to a like-numbered component (e.g., "402") unless indicated otherwise.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
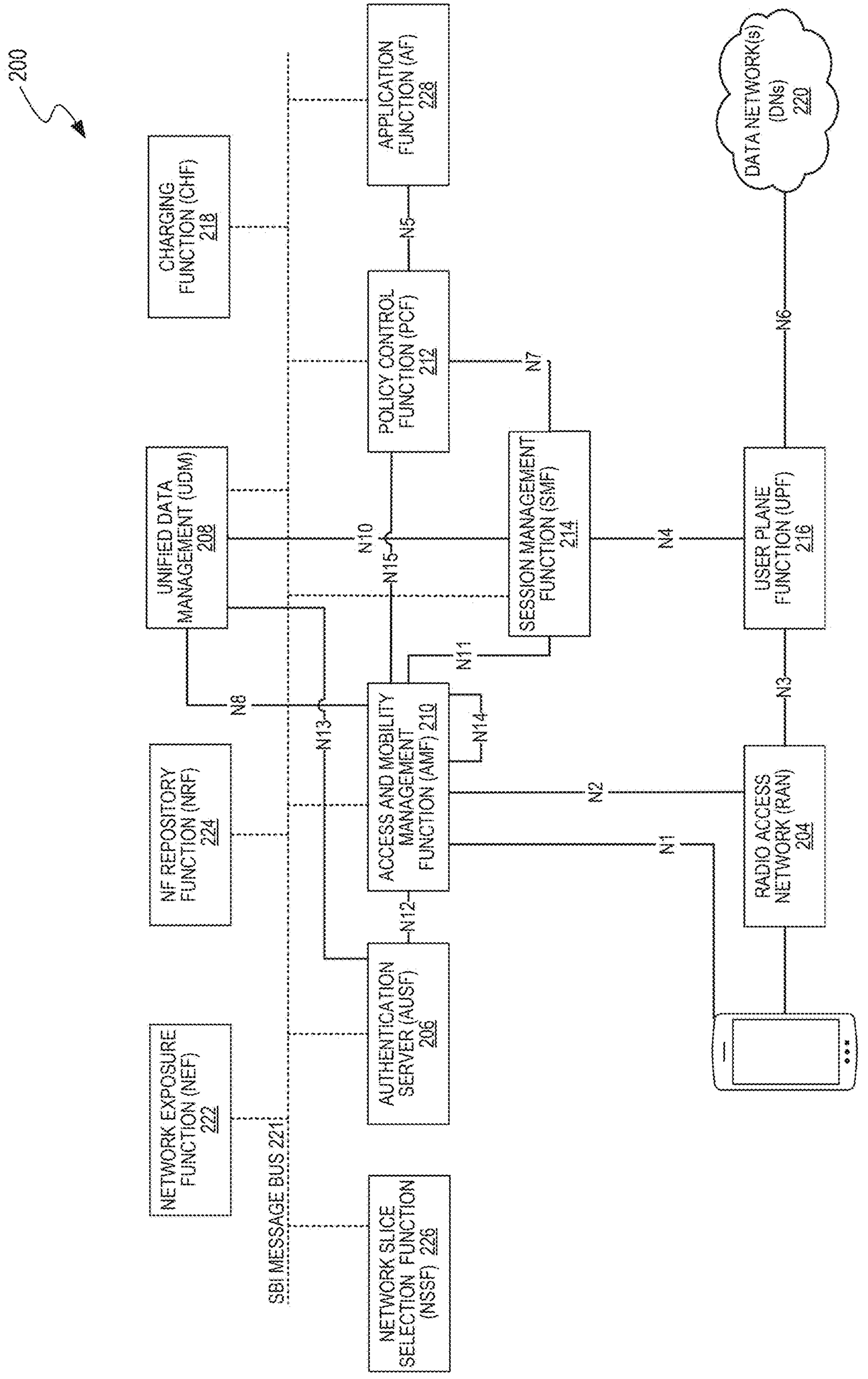
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFS include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them.

The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Dynamic Translation Relay System

Figure 3:
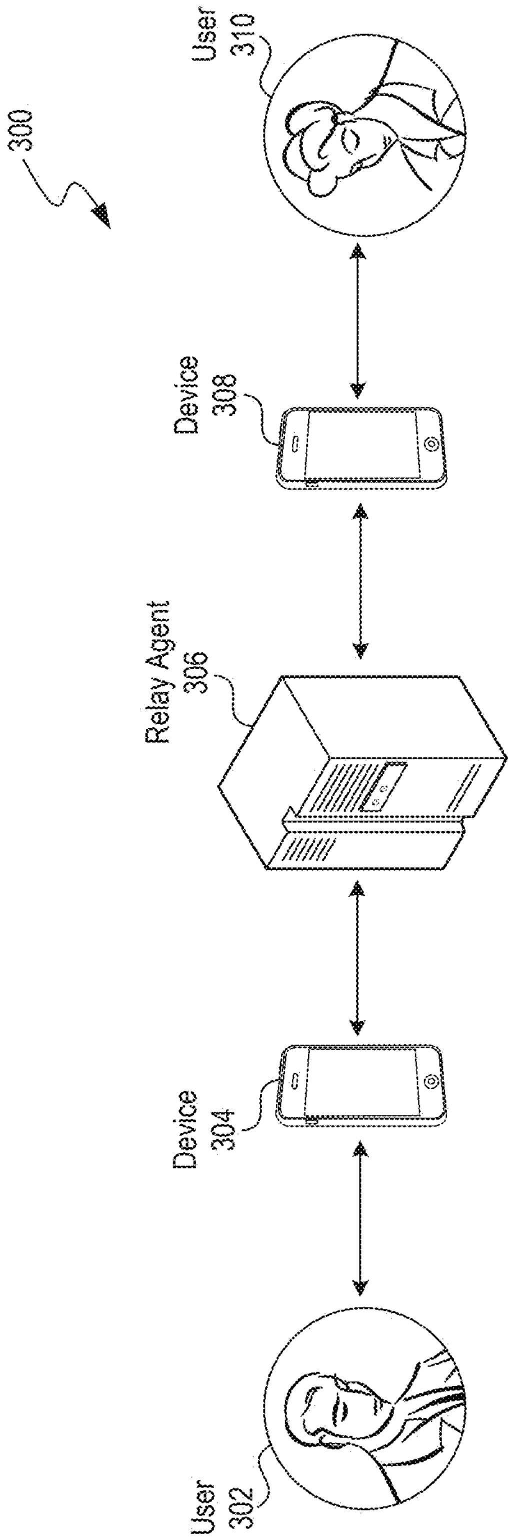
FIG. 3 is a block diagram that illustrates a relay system.

FIG. 3 is a block diagram that illustrates an example relay system 300. The relay system 300 includes the devices 304, 308 and a relay agent 306. Devices 304, 308 can be any of wireless devices 104-1 through 104-7 illustrated and described in more detail with reference to FIG. 1. The relay agent 306 can be a computer system or a computer server that is external to the devices 304, 308. In some implementations, the relay agent 306 is a module implemented on device 304 and/or device 308. The relay system 300 can be implemented using components of the example computer system 900 illustrated and described in more detail with reference to FIG. 9. Likewise, implementations of relay system 300 can include different and/or additional components or can be connected in different ways.

As shown in FIG. 3, a user 302 interacts with a device 304 to send a communication to the user 310. The relay system 300 receives inputs from the user 302 via the device 304. The inputs can include audio, text, and/or gestures. The relay system 300 sends a translated version of the received inputs, via the relay agent 306, to the device 308 for presentation to the user 310. Likewise, inputs from the user 310 are relayed via the relay agent 306 to device 304 for presentation to the user 302.

The user 302 can interact with the device 304 to provide a communication to the user 310. The communication from the user 302, intended for the user 310, is transformed by the relay agent 306. The relay agent 306 intercepts and processes inputs received from the user 302 by extracting contextual features from the received inputs. Processing of features using artificial intelligence is illustrated and described in more detail with reference to FIG. 8. The received inputs are transformed based on the extracted contextual features and relayed to device 308, where the communication is presented to the receiving user 310 in a manner consistent with their preferred communication mode and device capabilities.

For example, the user 302 initiates the communication by speaking into device 304. The relay agent 306 intercepts the audio communication and transcribes the audio input into text format. In some implementations, the audio input is upscaled prior to transcription to provide a more accurate translation by amplifying the acoustic properties of the audio input. For example, upscaling can include amplifying certain acoustic properties of the audio input, such as increasing the volume of quiet passages or boosting specific frequency ranges to improve clarity, which helps the system better distinguish speech from background noise and other sources of interference. Once transcribed, the communication input is translated into synthesized speech and relayed to device 308. The user 310, upon receiving the synthesized speech, listens to the message conveyed by the user 302 and can respond with a new set of inputs, thus initiating a dialogue between the users, facilitated by the dynamic transformations of the communications using the relay system 300.

Autonomous Speech Enhancement Relay System

Figure 4:
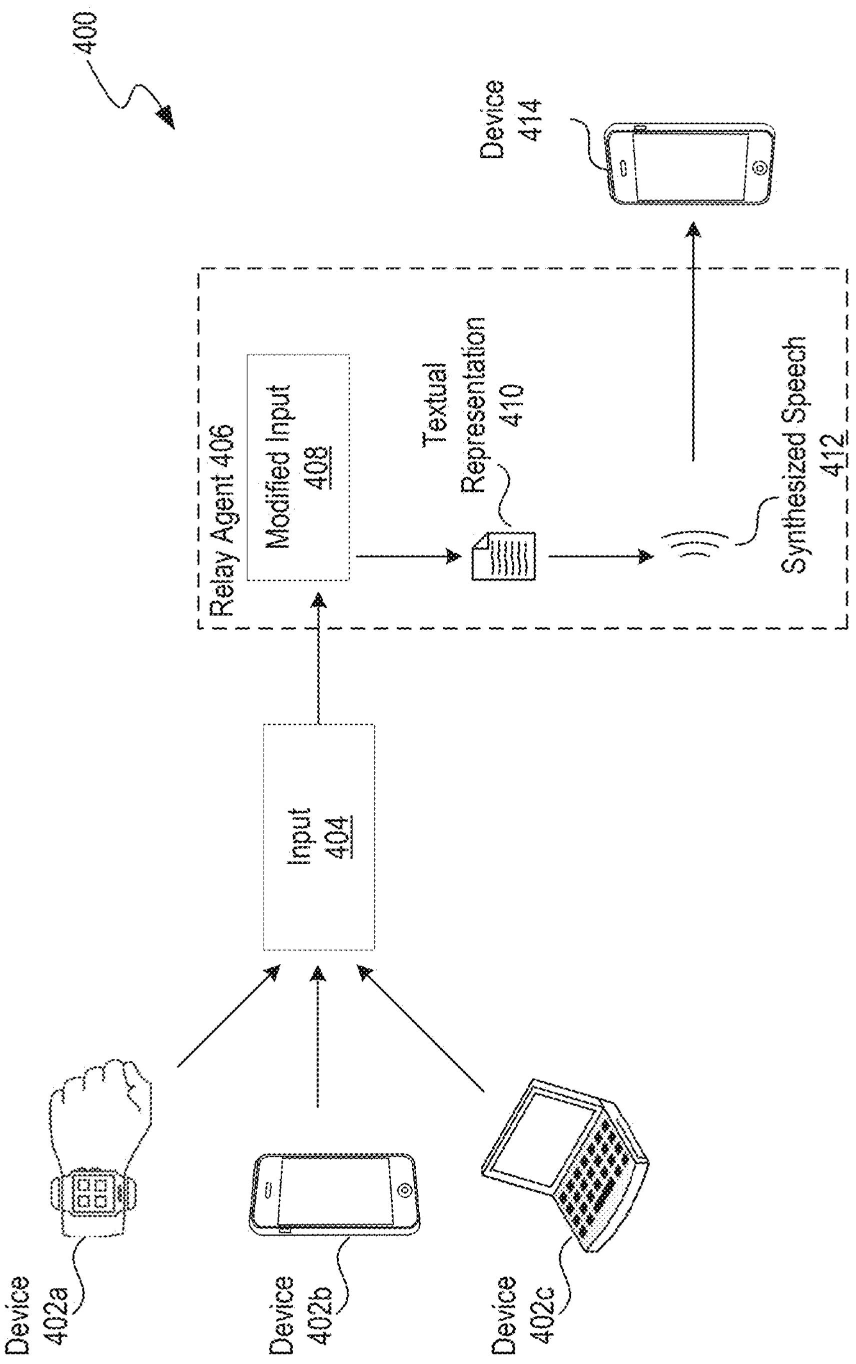
FIG. 4 is a block diagram that illustrates an environment containing a speech enhancement relay system.

FIG. 4 is a block diagram that illustrates an environment containing the speech enhancement relay system 400. The speech enhancement relay system 400 includes devices 402, input 404, relay agent 406, and audio device 414. Any of the devices 402 can be an audio device. Devices 402, 414 can be any of wireless devices 104-1 through 104-7 illustrated and described in more detail with reference to FIG. 1. A device 402 can receive, process, and/or reproduce audio signals. Examples of audio devices include devices having microphones, such as smartphones, or laptops. The relay agent 406 can be a computer system or a computer server that is external to the devices 402, 414. In some implementations, the relay agent 406 is a module implemented on a device 402 and/or audio device 414. The speech enhancement relay system 400 can be implemented using components of the example computer system 900 illustrated and described in more detail with reference to FIG. 9. Likewise, implementations of speech enhancement relay system 400 can include different and/or additional components or can be connected in different ways.

A device 402 provides an input 404 to the relay agent 406. In some implementations, the input 404 is provided during a communication session, where the input 404 is for a portion of the session. An input can include any form of sound or speech, such as an audio signal, received by an electronic device through a microphone and/or audio sensor. The audio input 404 can encompass various types of auditory information, including spoken words, ambient sounds, music, and/or other audio signals. For example, if the input 404 is collected through the microphone of a device 402 while the user is speaking in a coffee shop, the input 404 includes verbalizations such as the user's voice, background music of the coffee shop, background conversations of other customers, background coffee-making sounds, and more. In some implementations, the input 404 includes text, gestures, and/or verbalizations. Gestures can include communication such as sign language and/or emotional gestures (e.g., waving an individual's hands in frustration). Verbalizations can include both speech by a user and background noise (e.g., the noise of other conversations in a coffee shop, the sound of the coffee machine in a coffee shop).

The input 404 is transmitted from one or more of the devices 402 to the relay agent 406, where the relay agent 406 transforms the input 404 into the modified input 408. To transform the input 404 into the modified input 408, the relay agent 406 can extract acoustic properties, and/or expressive parameters from the input 404. Acoustic properties are measurable characteristics of a sound wave, such as pitch, frequency, amplitude, and duration, while expressive parameters capture elements such as prosody, intonation, and emotional cues conveyed through the input 404. The acoustic properties allow different portions of the input 404 to be differentiated between. Acoustic properties encompass various characteristics of the input 404 that define the auditory properties of the input 404. The acoustic properties characterize structural and/or temporal aspects of the input 404.

Extracting acoustic properties from the input 404 involves applying signal processing techniques to capture relevant characteristics of the input 404. For example, Mel-Frequency Cepstral Coefficients (MFCCs) are extracted that mimic the human auditory system's response to sound by converting the frequency spectrum of the input 404 into a series of coefficients that represent different frequency bands. The extraction process can include segmenting the input 404 into short-time frames, computing the power spectrum, and extracting features that describe the distribution of energy across different frequency bands.

Deep learning models can be used to capture patterns and dependencies within the input 404. Convolutional neural networks (CNNs) can be used to capture spatial patterns in the input 404 by detecting local patterns such as frequency contours, spectral shapes, and transient events in the input 404. Recurrent neural networks (RNNs) can be used to capture temporal dependencies within sequential data of the input 404 by maintaining internal memory states that evolve over time steps to capture characteristics such as rhythm, melody, and speech dynamics. Long short-term memory (LSTM) networks, a type of RNN, can be used to selectively retain and/or discard information over time to better capture context and temporal structure in audio sequences. Deep learning and other AI methods are illustrated and described in more detail with reference to FIG. 8.

In some implementations, the speech enhancement relay system 400 captures the envelope of an input 404 that represents amplitude variations. For example, peaks or extremes of the input 404 can be detected, where the peaks represent the maximum amplitude points of the signal, while the troughs represent the minimum amplitude points. By connecting the peaks and troughs, the envelope of the input 404 can be delineated to provide a representation of the amplitude variations of the input 404. The input 404 can be converted into a complex-valued signal, e.g., using a domain transform, where the real part corresponds to the original signal, and the imaginary part represents a Hilbert transform of the input 404. By extracting the magnitude of the complex-valued signal that corresponds to the envelope of the original signal, the amplitude modulation can be captured to understand the amplitude variation of the input 404.

The speech enhancement relay system 400 can measure the "center of mass" of the frequency spectrum of the input 404 to represent the average frequency weighted by the amplitude spectrum. For example, spectral centroid extraction techniques involve computing the weighted mean of the frequency spectrum, where higher energy frequencies contribute more to the centroid than lower energy frequencies. For example, in a musical piece with a predominant bass line and higher frequency harmonics, the spectral centroid extraction technique identifies the bass frequencies as the dominant energy contributors, and thus positions the centroid towards the lower end of the frequency spectrum. Conversely, in a high-pitched vocal recording, the centroid shifts towards the higher frequencies due to the prominence of the vocal harmonics.

Zero-crossing rate (ZCR) techniques can be used to measure the rate at which the input 404 changes sign (crosses the zero-amplitude level) within a given time frame. ZCR extraction techniques involve counting the number of zero-crossings in the input 404 and normalizing by the signal length. For example, in speech activity detection, voiced speech segments exhibit a higher ZCR due to the periodic nature of vocal fold vibrations, resulting in frequent zero-crossings. On the other hand, unvoiced segments, such as fricatives or plosives, have fewer zero-crossings due to their noisy and irregular waveform.

The speech enhancement relay system 400 can use spectral flux to measure the rate of change in the frequency spectrum of the input 404 over time. The spectral flux represents the amount of spectral variation between consecutive frames. Spectral flux extraction techniques are used to compute the difference between the spectral magnitude of consecutive frames and sum the positive differences. For example, in an input 404 with a sudden change, such as yelling, the spectral flux exhibits a sharp increase during the transient events to indicate significant changes in the frequency spectrum between consecutive frames.

On the other hand, expressive parameters serve as cues for discernible emotions, intentions, and/or nuances conveyed through the audio content. Expressive parameters encompass elements such as intonation, rhythm, volume modulation, prosodic features, and/or any other element that conveys the speaker's emotional state, emphasis, and/or intent. Expressive parameters provide the relay agent 406 with an understanding of the underlying sentiment and context embedded within the input 404. For instance, a sudden increase in volume can signify excitement and/or urgency, while a gradual decrease can indicate a shift towards a more subdued and/or contemplative tone. Additionally, for example, in a conversation, expressive parameters such as intonation, rhythm, and volume modulation can convey enthusiasm, warmth, and/or humor, enhancing the overall rapport and connection between the speakers. Similarly, subtle variations in prosody and emphasis can communicate confidence, authority, and/or persuasion.

The relay agent 406 upscales the audio to create a modified input 408. The modified input 408 for an audio input amplifies the acoustic properties extracted. For example, the relay agent 406 identifies nuances in the acoustic properties and expressive parameters of the input 404 such as pitch and amplitude (e.g., amplitude variations), and amplifies identified nuances in the modified input 408 to ensure that important cues and nuances are preserved and effectively conveyed to the listener. By selectively enhancing aspects of the input 404, the relay agent ensures that the synthesized speech retains the nuances and expressiveness of the original speaker, and removes unwanted portions of the input such as the background noise of the verbalization. The modified input 408 is transcribed into a textual representation 410, maintaining the contextual relevance of the input 404.

Following the conversion to the textual representation 410, the relay agent 406 generates synthesized speech 412 from the textual representation 410. The synthesized speech 412 is a natural-sounding rendition (closely resembling natural human speech) replicating the cadence and intonation of the original message. The parameters of the synthesized speech 412 are configurable by a user (e.g., the user can choose to sound like a fourteen-year-old African American male). For example, the relay agent 406 transforms the textual representation 410 into the synthesized speech 412 using databases of recorded speech segments and/or statistical models of human speech production to generate speech waveforms that closely mimic natural speech patterns. Techniques such as prosody modeling, voice morphing, and formant manipulation can be employed to adjust aspects of pitch, tempo, and/or timbre, ensuring that the synthesized speech 412 aligns with the intended emotional tone and communicative context of the original message based on the extracted expressive parameters. The synthesized speech 412 is relayed to the receiving audio device 414 operated by a user.

In some implementations, the relay agent 406 dynamically assesses factors related to a communication such as the duration of utterances, pauses, and natural breaks in speech to identify suitable boundaries for segmentation. By monitoring the pace and rhythm of the conversation, the relay agent 406 can adaptively adjust the size of the input segments to balance responsiveness with processing overhead. The relay agent 406 can use contextual cues, such as speaker turn-taking patterns and semantic coherence, to inform the segmentation decisions of the relay agent 406. For instance, in a dialogue between multiple speakers, the relay agent 406 waits for natural pauses or speaker transitions before segmenting the input 404, ensuring that complete utterances are received and translated cohesively. Additionally, the relay agent 406 can employ predictive modeling techniques to anticipate future speech content based on the current context.

In some implementations, prior to generating the synthesized speech 412, the relay agent 406 identifies and rectifies syntactic or grammatical errors in textual representation 410. The process can include parsing the textual representation 410 to identify parts of speech, sentence structure, verb tense, subject-verb agreement, punctuation, and other grammatical elements. Automated algorithms can be employed to detect grammatical errors in the text, such as incorrect word usage, faulty sentence structure, agreement discrepancies, and punctuation mistakes. The algorithms can use rule-based approaches, statistical methods, and/or machine learning models trained on large corpora of grammatically correct text to identify deviations from standard grammar rules. Once syntactic and/or grammatical errors are detected, corrective measures are applied to rectify the errors and improve the overall grammatical structure of the text. For example, the relay agent 406 can automatically correct spelling mistakes, adjust word order, insert missing punctuation, resolve subject-verb disagreements, and/or revise ambiguous or awkward phrasing.

In some implementations, advanced language models or transformer-based architectures, such as Generative Pre-trained Transformer (GPT), Bidirectional Encoder Representations from Transformers (BERT), and/or Long Short-Term Memory (LSTM) networks, are utilized to generate grammatically coherent text and predict the most probable sequence of words given the context. Feedback mechanisms can be incorporated to gather user input or corrections and fine-tune the text-to-speech system's grammatical performance over time. For example, users can provide feedback on the quality, grammatical correctness, and naturalness of the synthesized speech 412, allowing the relay agent 406 to adapt and improve its language generation capabilities based on user preferences.

Generating the textual representation 410 and synthesized speech 412 can be performed using a language-specific AI model, such as an English AI model. In some implementations, the language-specific models are specifically trained on text and/or speech data in a particular language (e.g., English) to capture patterns and distinguishing characteristics specific to that language. For example, when using an English language model, the system learns the grammatical rules, vocabulary, idiomatic expressions, and syntactic patterns characteristic of English text.

The relay agent 406 can query external databases and/or models to retrieve relevant information related to the input 404. For example, if the relay agent 406 encounters a specific term or concept that requires further clarification or context, the relay agent 406 queries external databases and/or models to access additional information, definitions, and/or related resources.

Figure 5:
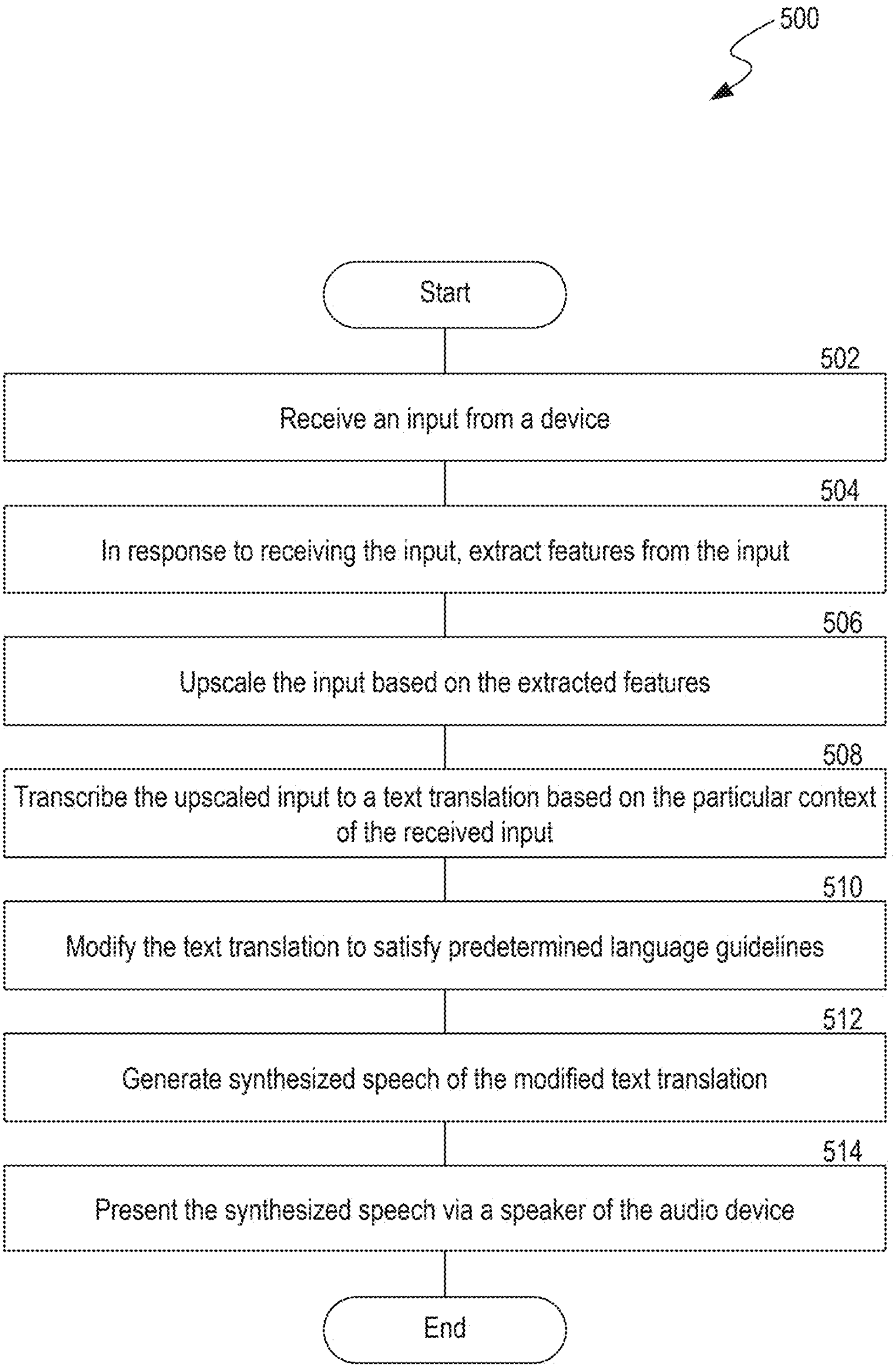
FIG. 5 is a flowchart that illustrates a process to generate synthesized speech from an input.

FIG. 5 is a flowchart that illustrates a process 500 to generate synthesized speech from an input. In one example, the process 500 is performed by a speech enhancement relay system (e.g., the speech enhancement relay system 400 of FIG. 4) to generate synthesized speech 412. The process 500 can also be performed by a computer system operating a telecommunications network (e.g., network 100 of FIG. 1). In some implementations, the process 500 is performed by a computer system, e.g., computer system 900 illustrated and described in more detail with reference to FIG. 9. Likewise, implementations can include different and/or additional steps or can perform the steps in different orders.

At 502, the speech enhancement relay system receives, using a microphone, an input from a device. An example input 404 and example devices 402, 414 are illustrated and described in more detail with reference to FIG. 4. In some implementations, the input has a particular context. The context of an input is described in more detail with reference to FIG. 4.

At 504, in response to receiving the input, the speech enhancement relay system extracts features from the input. The features can describe the acoustic properties of the input that is audio. For example, the features can include pitch, duration, timbre, formants, tempo, zero-crossing rate, spectral flux, spectral centroid, and/or mel-frequency cepstral coefficients (MFCCs). In some implementations, for an audio input, the features include cues for identifiable emotions in the audio input (e.g., expressive parameters). The features can include intonation, pitch, tempo, volume, and/or prosody. In some implementations, the expressive parameters are configurable based on user input received from the device. For example, the speech enhancement relay system receives a user input on the device, where the user input is used to adjust the features. In some implementations, the speech enhancement relay system can capture patterns or behaviors within the audio input using a deep learning model. The deep learning model is iteratively refined using previous audio inputs. Deep learning and other AI methods are illustrated and described in more detail with reference to FIG. 8.

At 506, the speech enhancement relay system upscales the input based on the extracted features. The upscaled input amplifies the extracted features of the input. The speech enhancement relay system dynamically upscales the input based on features detected in real-time.

At 508, the speech enhancement relay system transcribes the upscaled input to a text translation based on the particular context of the received input. The text translation maintains the contextual relevance of the received input. By considering factors such as linguistic context, semantic cues, and other predefined user preferences, the speech enhancement relay system generates text translations that more closely represent the intended context of the original input. In some implementations, the speech enhancement relay system incorporates user feedback, error correction algorithms, and linguistic heuristics to iteratively improve the speech enhancement relay system's transcription accuracy and contextual understanding over time.

At 510, the speech enhancement relay system modifies the text translation to satisfy predetermined language guidelines. The predetermined language guidelines are based at least in part on established language standards and can include an array of linguistic rules, syntactic patterns, and grammatical norms. The speech enhancement relay system identifies potential areas for modification of the text translation based on the predetermined language guidelines. The modification of the text translation can be guided by contextual considerations and user preferences to ensure that the final output aligns with the intended message and communicative objectives of the input. By incorporating contextual relevance, semantic coherence, and user-centric design principles into the modification process, the speech enhancement relay system produces text translations that are not only linguistically accurate but also contextually appropriate.

In some implementations, the modification of the text translation involves harmonizing the linguistic structure and stylistic conventions to align with predefined language guidelines and standards. This harmonization process entails adjusting the wording, phrasing, and sentence structure to conform to established linguistic norms, thereby enhancing the overall clarity, coherence, and readability of the translated text.

At 512, the speech enhancement relay system generates synthesized speech of the modified text translation. Generating the synthesized speech is directed by the expressive parameters in the received input. The parameters cause the synthesized speech to emulate the identifiable emotions in the input. For an audio input, by analyzing tonal variations, vocal inflections, and speech patterns inherent in the audio input, the speech enhancement relay system can identify and replicate emotional nuances and/or other expressive qualities in the synthesized speech.

At 514, the speech enhancement relay system outputs (e.g., presents) the synthesized speech via a speaker of an audio device (e.g., a user device). In some implementations, the speech enhancement relay system displays a confidence score associated with the synthesized speech to the device, where the confidence score represents a reliability of the synthesized speech. The device can be configured to receive user feedback regarding the confidence score. For example, the speech enhancement relay system can receive user feedback from the device, where the user feedback relates to deviations between the generated synthesized speech and desired synthesized speech. The desired synthesized speech is based on user feedback received by the device. The speech enhancement relay system iteratively adjusts the expressive parameters to better align the generated synthesized speech with the desired synthesized speech.

Dynamic Hybrid Multimodal Input Relay System

Figure 6:
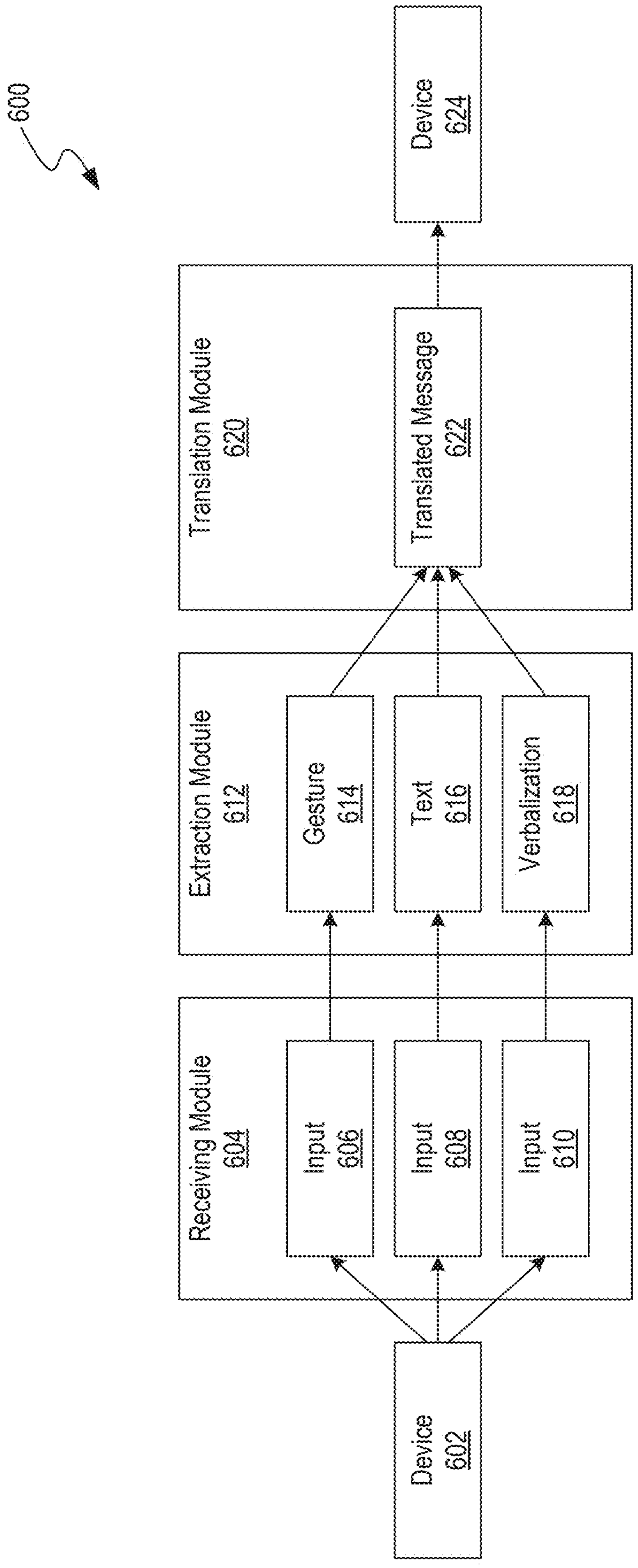
FIG. 6 is a block diagram that illustrates an environment containing a multimodal input relay system.

FIG. 6 is a block diagram that illustrates a multimodal input relay system 600. The multimodal input relay system 600 includes devices 602, 624, a receiving module 604, an extraction module 612, and a translation module 620. The devices 602, 624 can be any of wireless devices 104-1 through 104-7 illustrated and described in more detail with reference to FIG. 1. The receiving module 604, extraction module 612, and/or translation module 620 can each be a computer system or a computer server that is external to the devices 602, 624. In some implementations, the multimodal input relay system 600 is a module implemented on the device 602 and/or the device 624. The relay system 600 can be implemented using components of the example computer system 900 illustrated and described in more detail with reference to FIG. 9. Likewise, implementations of relay system 600 can include different and/or additional components or can be connected in different ways.

The device 602 initiates communication by sending one or more multimodal inputs to the receiving module 604. The multimodal inputs 606, 608, 610 can encompass various modes of communication, such as gestures (e.g., expressing emotions, sign language), text, and/or verbalizations (e.g., background noise, speech) to reflect a user of the device 602's preferred means of expression. The modes of communication can be captured by other devices, such as virtual reality (VR) devices, augmented reality (AR) devices, and/or smartwatches, and transmitted to the device 602. For example, if a user of the device 602 is angrily waving his hands and yelling to communicate, the multimodal inputs include gestures (expressing emotions) and verbalizations (speech). In another example, if the user of the device 602 is typing and speaking to communicate, the multimodal inputs include a verbalization (speech) input and a text input.

The receiving module 604 transfers the inputs 606, 608, 610 to an extraction module 612, where a communication mode corresponding to each input 606, 608, 610 is determined and/or categorized based on the inherent characteristics and attributes of the input 606, 608, 610. For example, in FIG. 6, input 606 is identified as a gesture 614, input 608 is identified as text 616, and input 610 is identified as verbalization 618. In some implementations, the extraction module 612 uses Artificial Intelligence (AI) models to dynamically identify the appropriate communication mode for each input. Processing of communication modes using AI is illustrated and described in more detail with reference to FIG. 8. For example, machine learning models trained on labeled datasets of verbalizations, text, and/or gesture inputs can learn to differentiate between different communication modes based on the features extracted during signal processing.

The identified communication mode information, along with the corresponding inputs 606, 608, 610, is transmitted to the translation module 620. The translation module 620 generates a translated message 622. The translation module 620 transforms the raw inputs 606, 608, 610, which can encompass gestures, text, verbalizations, or a combination thereof, into a standardized format that can be effectively processed and understood by the system. The transformation process is tailored to the specific communication mode associated with each input, ensuring that the content of the input remains contextually relevant and coherent throughout the translation process.

If the input is identified as a gesture (e.g., input 606), the translation module 620 analyzes the spatial and temporal characteristics of motion signals in the input to capture relevant information for gesture recognition and understanding.

The translation module 620 can track the positions of key skeletal joints (e.g., wrists, elbows, shoulders) over time using depth sensors or cameras. The joint positions can be used to compute features such as joint angles, distances between joints, and velocities of movement. Skeletal joint positions provide rich spatial information about the input, allowing for recognition of hand and body movements. For example, when a user raises their hand to ask a question, the translation module 620 analyzes the positions of their wrists, elbows, and shoulders to compute features such as joint angles and velocities of movement. By recognizing these spatial cues, the multimodal input relay system 600 accurately interprets the input as a request for participation and can infer that the participant has a question.

The translation module 620 can use specific geometric and kinematic features designed to capture distinctive aspects of inputs that are identified as gestures. For example, the curvature of hand trajectories, hand orientation, hand shape, and/or finger configurations are extracted from raw motion data and used as input to machine learning algorithms for gesture recognition. For example, when a user gestures with their hand to express agreement, the translation module 620 extracts information such as the curvature of hand trajectories, hand orientation, and finger configurations to interpret the gesture as a positive response to the discussion.

The translation module 620 uses properties such as motion speed, acceleration, and directionality over time to measure the similarity between two motion sequences by aligning the two motion sequences in time and inferring the context of the input based on the similarities of the properties. For example, when a user nods their head in agreement, the module measures the similarity between the motion sequence of their nodding and predefined templates of affirmative gestures. By aligning the motion sequences and comparing the motion sequences based on similarity, the system interprets the input as a confirmation or approval of the ongoing discussion.

The translation module 620 can use deep learning methods such as CNNs and RNNs to capture spatial patterns in gesture images or skeleton joint positions and/or model temporal dependencies in sequential gesture data. The deep learning model can be iteratively refined using previous inputs. Deep learning and other AI methods are illustrated and described in more detail with reference to FIG. 8.

The translation module 620 can track the movement of pixels between consecutive frames of video data to estimate the velocity field of motion in an image sequence, providing information about the direction and magnitude of movement. The translation module 620 can detect subtle changes in motion over time. For example, when a user waves their hand more than usual, the module detects subtle changes in motion over time and estimates the direction and magnitude of movement. By analyzing these motion cues, the multimodal input relay system 600 infers that the user is earnest.

If a communication mode of an input is identified as text (e.g., input 608), the translation module 620 parses the input to extract meaning, identify key concepts, and resolve ambiguities within the input. The translation module 620 parses the input to break down the input into the input's constituent elements, such as words, phrases, and sentences. Using semantic analysis algorithms and/or natural language processing (NLP) techniques, the translation module 620 discerns the underlying intent, themes, and relevant information conveyed by the user. The translation module 620 identifies semantic relationships between words and entities, clarifies ambiguous terms and/or phrases, and infers context from surrounding linguistic cues. For example, the translation module 620 resolves ambiguities inherent in the input. Ambiguities can arise due to multiple possible interpretations of certain words and/or phrases, linguistic nuances, and/or contextual dependencies. To address this, the translation module 620 employs linguistic rules, extracted contextual information, and/or external models to determine the most likely interpretation in line with the user's intent.

Syntax analysis can be used to parse sentences in the input to determine the grammatical structure according to predefined syntactic rules. For example, in the sentence "The cat chased the mouse," the sentence is broken down into a hierarchical structure, identifying the subject ("The cat") and the verb phrase ("chased the mouse"), while highlighting the relationships between words, such as the subject-verb relationship between "cat" and "chased" and the direct object relationship between "chased" and "mouse."

Semantic analysis can be used to extract meaning from input by understanding the relationships between words and their context. Semantic similarity analysis measures the relationship between words and/or phrases based on their semantic content. For example, in the sentence “The book is on the table,” semantic analysis identifies the predicate “on” and its associated arguments, namely “book” and “table,” discerning the relationship between the book’s location and the table.

The translation module 620 can identify and categorize named entities such as people, organizations, locations, and dates mentioned in the input. For example, in the sentence “Barack Obama was born in Hawaii,” the translation module 620 identifies “Barack Obama” as a person and “Hawaii” as a location, recognizing and classifying the terms in the input as named entities.

The translation module 620 can tag grammatical categories (e.g., noun, verb, adjective) to words in a sentence of the input to help in understanding the syntactic structure and meaning of sentences. For example, in the phrase “She sells seashells by the seashore,” the translation module 620 labels each word with the word’s respective part of speech, distinguishing between pronouns (e.g., “She”), verbs (e.g., “sells”), nouns (e.g., “seashells,” “seashore”), prepositions (e.g., “by,” “the”), and determiners (e.g., “the”).

The translation module 620 can determine the sentiment or opinion expressed in the input by identifying the polarity (positive, negative, neutral) and intensity of sentiments expressed in the input. For example, in the statement “The movie was fantastic! I loved every minute of it,” sentiment analysis can detect a strong positive sentiment due to the exclamation mark and positive words within the sentence, which can indicate that the speaker enjoyed the movie and expressed enthusiasm about it. In another example, in the statement, “That move was better than I expected, but it was still horrible. I will probably still return to see the sequel though,” even though the beginning and end of the statement showed positive sentiments (e.g., “better than I expected,” “return to see the sequel”), the translation module 620 identifies a strong negative sentiment due to the word “horrible,” which can indicate that the speaker had a negative experience despite some positive sentiments in the input.

If the input is identified as a verbalization that is speech (e.g., input 610), the translation module 620 uses speech recognition algorithms to transcribe spoken words in the input into text format, while also considering nuances such as tone, intonation, and emphasis to preserve the intended input’s expressive qualities. The processing of speech inputs is illustrated and described in more detail with reference to FIGS. 4 and 5.

In some implementations, the translation module 620 employs multiple AI models tailored to specific communication modes. Depending on the communication mode identified by the extraction module 612, the translation module 620 switches between different AI models. When the communication involves a combination of text, verbalizations, and gestures the translation module 620 can employ a multimodal integration AI model capable of processing inputs from various communication modes simultaneously. For example, during a brainstorming session, a user speaks while simultaneously gesturing and typing ideas. The multimodal integration model analyzes all inputs concurrently and generates one translated message in response to receiving multiple inputs with different communication modes.

In some implementations, prior to generating the translated message, the translation module 620 identifies and rectifies any syntactic or grammatical errors in the inputs. Each input is converted into a textual representation before rectifying the syntactic or grammatical errors in the inputs. The process can include parsing the input to be rectified to identify parts of speech, sentence structure, verb tense, subject-verb agreement, punctuation, and other grammatical elements. In some implementations, automated algorithms are employed to detect grammatical errors in the text, such as incorrect word usage, faulty sentence structure, agreement discrepancies, and punctuation mistakes. The algorithms can use rule-based approaches, statistical methods, and/or machine learning models trained on large corpora of grammatically correct text to identify deviations from standard grammar rules. Once grammatical errors are detected, corrective measures are applied to rectify the errors and improve the overall grammatical structure of the input. For example, the translation module 620 automatically corrects spelling mistakes in text inputs, adjusts word order, inserts missing punctuation in text inputs, resolves subject-verb disagreements, and/or revises ambiguous or awkward phrasing.

In some implementations, advanced language models or transformer-based architectures, such as Generative Pre-trained Transformer (GPT), Bidirectional Encoder Representations from Transformers (BERT), and/or Long Short-Term Memory (LSTM) networks, are utilized to generate grammatically coherent text and predict the most probable sequence of words given the context. Feedback mechanisms can be incorporated to gather user input or corrections and fine-tune the multimodal input relay system’s 600 grammatical performance over time. For example, users can provide feedback on the quality, grammatical correctness, and naturalness of the synthesized speech, allowing the multimodal input relay system 600 to adapt and improve its language generation capabilities based on user preferences.

In some implementations, when confronted with multimodal inputs, the translation module 620 identifies the most prominent mode of communication within the inputs. For instance, if the users primarily rely on speech, the translation module 620 can prioritize the speech recognition model to ensure accurate transcription of spoken content, while still considering text and gesture inputs for supplementary context. Then, in times when the translations conflict, the speech translation is prioritized.

The translated message generated by the translation module can be presented in any communication mode based on the preferences and requirements of the users involved. For example, if the original input includes a mix of verbalizations, text, and gestures, the translated message integrates the modalities into a single communication mode. The choice of algorithms used by the translation module 620 can vary depending on the communication mode(s) identified for a given input.

The translated message 622 is relayed to the device 624, where the translated message 622 is presented for consumption by the intended recipient. The translated message can be presented to the participants in a format that best suits their preferences and accessibility needs. For instance, a hearing-impaired user can prefer to receive the translated message as text captions displayed on the screen, while other users can opt for synthesized speech if the user prefers auditory feedback. Additionally, participants can choose to receive the translated message in multiple modes simultaneously.

In some implementations, before the translated message 622 is relayed to the device 624, the user is given an option to accept or not accept the translated message 622 (e.g., through a user interface of the device 602). For example, the user may disagree with the translated message’s 622 embedded grammatical corrections. The user can choose to regenerate the translated message 622 and specify, through the device 602, specific rules (e.g., grammatical rules).

In some implementations, the translation module 620 dynamically switches between different sets of algorithms based on changes in the communication environment. For example, if a communication session transitions from primarily text-based interactions to a combination of verbalizations and gestures, the translation module 620 can dynamically reconfigure the processing pipeline to accommodate the new input modalities. In some implementations, the translation module 620 is static and changes the communication mode of the output based on predefined rules. Users can configure the predefined rules based on preference.

Figure 7:
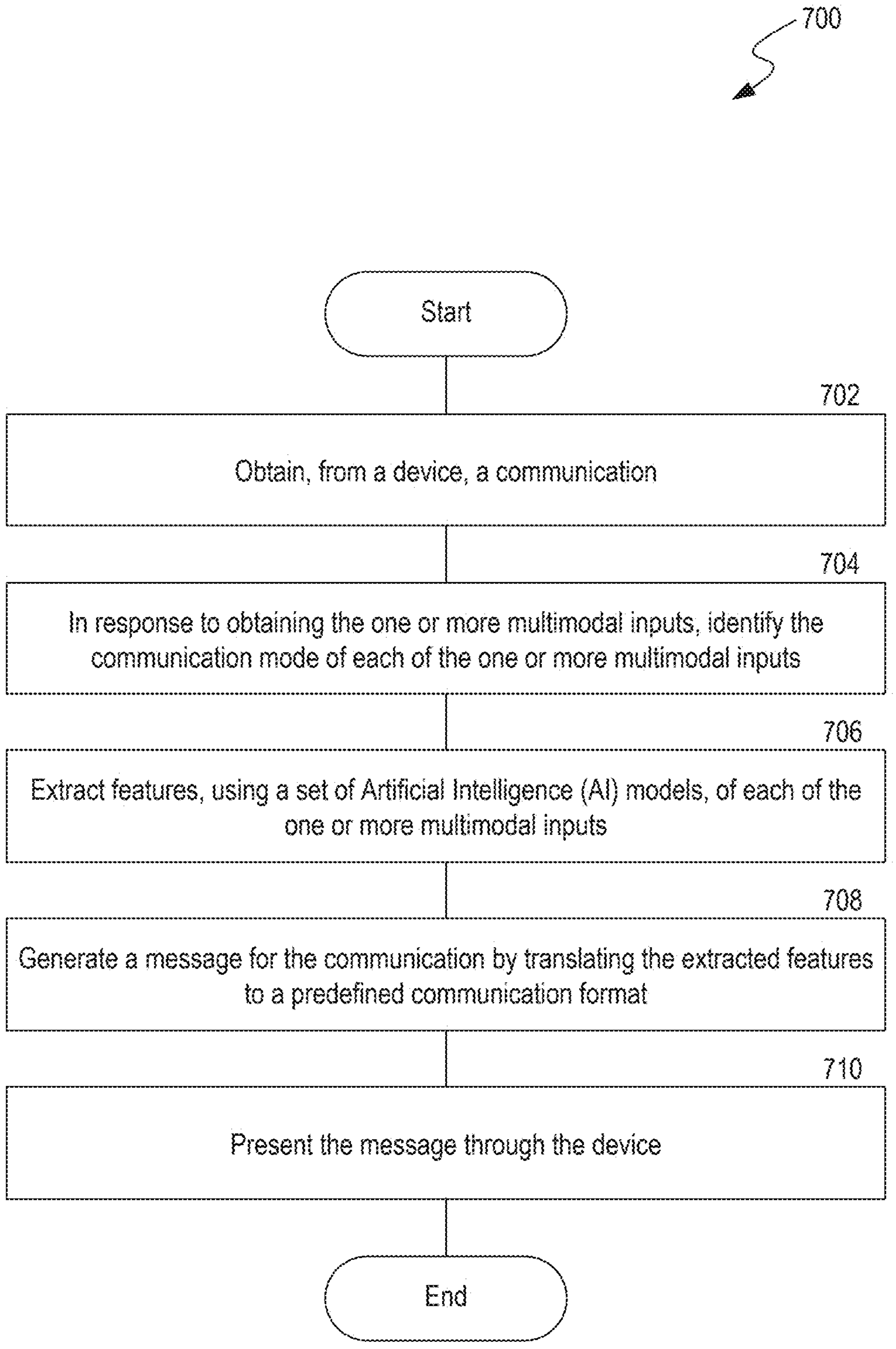
FIG. 7 is a flowchart that illustrates a process to generate a translated message from one or more multimodal inputs.

FIG. 7 is a flowchart that illustrates a process 700 to generate a translated message from one or more multimodal inputs. In one example, the process 700 is performed by a computer system such as a multimodal input relay system (e.g., the multimodal input relay system 600 in FIG. 6) to generate the translated message 622. The process 700 can be performed by a computer system operating a telecommunications network (e.g., network 100 of FIG. 1). In some implementations, the process 700 is performed by a computer system, e.g., computer system 900 illustrated and described in more detail with reference to FIG. 9. Likewise, implementations can include different and/or additional steps or can perform the steps in different orders.

At 702, the multimodal input relay system obtains, from a device, a communication. Example devices 602, 624 are illustrated and described in more detail with reference to FIG. 6. The communication includes one or more multimodal inputs. Example multimodal inputs 606, 608, 610 are illustrated and described in more detail with reference to FIG. 6. Each of the multimodal inputs corresponds to one of a set of communication modes. Example communication modes 614, 616, 618 are illustrated and described in more detail with reference to FIG. 6.

At 704, in response to obtaining the multimodal inputs, the multimodal input relay system identifies the communication mode of each of the multimodal inputs. For example, a textual input is assigned a "text" communication mode, a gesture input is assigned a "gesture" communication mode, and a speech input is assigned a "speech" communication mode.

At 706, the multimodal input relay system extracts features, using a set of Artificial Intelligence (AI) models, from each of the multimodal inputs. Each model in the set of AI models corresponds to at least one communication mode. The features characterize each of the multimodal inputs. Example extracted features of different communication modes are illustrated and described in more detail with reference to FIG. 6. In some implementations, the multimodal input relay system dynamically switches between each of the set of AI models based on the communication mode of one or more of the multimodal inputs. The multimodal input relay system can dynamically switch, for example, between the set of AI models based on confidence scores generated by each of the set of AI models for the corresponding multimodal input. In some implementations, the multimodal input relay system extracts features from a portion of the multimodal inputs. For example, one or more of the multimodal inputs can contain metadata including temporal information indicating a portion of the one or more multimodal inputs, and the features can be extracted from the indicated portion of the multimodal input(s). The multimodal input relay system can use deep learning techniques such as convolutional neural networks (CNNs) and/or recurrent neural networks (RNNs) to identify patterns and behaviors within the extracted features. Deep learning and other AI methods are illustrated and described in more detail with reference to FIG. 8.

At 708, the multimodal input relay system generates a translated message for the communication by translating the extracted features to a predefined communication format. The predefined communication format can be in the form of text, verbalizations, and/or gestures. For example, if the user provides spoken instructions (e.g., verbalizations) accompanied by hand waving to emphasize key points (e.g., gestures), the multimodal input relay system can use speech recognition algorithms to transcribe the spoken words into text. Simultaneously, the multimodal input relay system can analyze the trajectory and dynamics of the hand waving using computer vision techniques to interpret the intended meaning and emphasis. For example, if the user jots down notes or diagrams on a shared digital whiteboard (e.g., text), optical character recognition (OCR) algorithms can be used to convert the handwritten annotations into digital text. Having extracted and interpreted the features from the user input, the multimodal input relay system generates, for example, an audio clip emulating the intended expressive qualities of the user's communication (e.g., in a frustrated tone if the hand gestures were interpreted to be indicative of frustration).

At 710, the multimodal input relay system presents the translated message via a device, such as devices 602, 624 that are illustrated and described in more detail with reference to FIG. 6. In some implementations, the mode of presentation is predefined. For example, the presentation mode can be via text, visual displays, audio, haptic feedback, or a combination thereof.

The multimodal input relay system determines a weight of each of the inputs to the communication, where the weight of each of the multimodal inputs is based on the number of extracted features. For example, multimodal inputs having more extracted features are assigned a higher weight, whereas multimodal inputs having fewer extracted features are assigned a lower weight. Multimodal inputs having fewer extracted features can be removed from the translated message. For example, a predefined threshold weight determines which multimodal inputs are removed (e.g., background noise).

In some implementations, the multimodal input relay system creates a user profile including user preferences based on previously translated messages and/or previously extracted contextual features, where the translated message is generated based on the user profile. For example, the user profile can include preferences related to a preferred pitch or frequency of a translated message presented in the form of audio.

The multimodal input relay system can generate confidence scores, via one or more AI models, for the corresponding multimodal input. The confidence scores are configured to represent the reliability of a corresponding AI model. In some implementations, the multimodal input relay system dynamically switches between the AI models based on the generated confidence scores.

AI System

Figure 8:
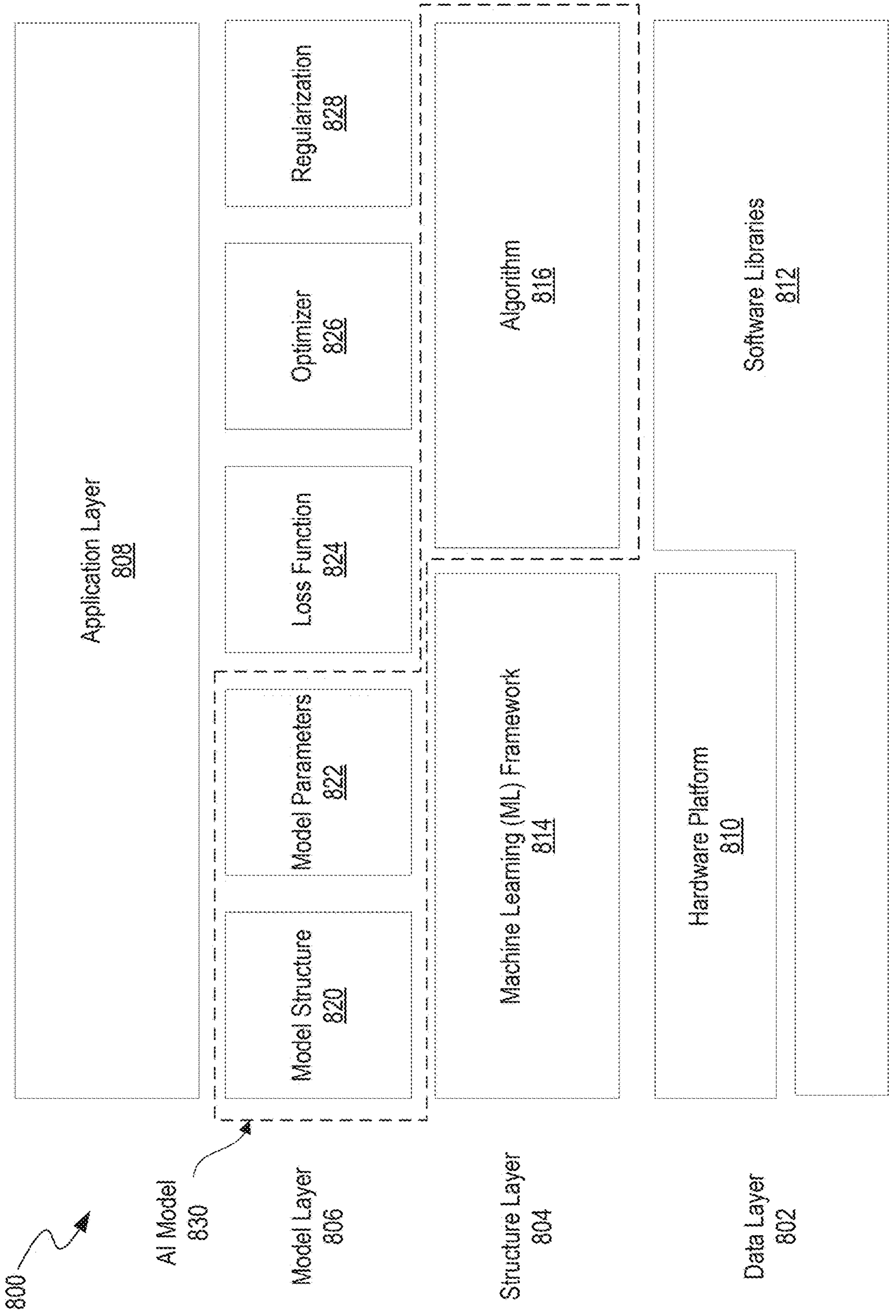
FIG. 8 is a block diagram illustrating an example artificial intelligence (AI) system, in accordance with one or more implementations of this disclosure.

FIG. 8 is a block diagram illustrating an example artificial intelligence (AI) system 800, in accordance with one or more implementations of this disclosure. The AI system 800 is implemented using components of the example computer system 900 illustrated and described in more detail with reference to FIG. 9. For example, the AI system 800 can be implemented using the processor 902 and instructions 908 programmed in the memory 906 illustrated and described in more detail with reference to FIG. 9. Likewise, implementations of the AI system 800 can include different and/or additional components or be connected in different ways.

As shown, the AI system 800 can include a set of layers, which conceptually organize elements within an example network topology for the AI system's architecture to implement a particular AI model 830. Generally, an AI model 830 is a computer-executable program implemented by the AI system 800 that analyzes data to make predictions. Information can pass through each layer of the AI system 800 to generate outputs for the AI model 830. The layers can include a data layer 802, a structure layer 804, a model layer 806, and an application layer 808. The algorithm 816 of the structure layer 804 and the model structure 820 and model parameters 822 of the model layer 806 together form the example AI model 830. The optimizer 826, loss function engine 824, and regularization engine 828 work to refine and optimize the AI model 830, and the data layer 802 provides resources and support for application of the AI model 830 by the application layer 808.

The data layer 802 acts as the foundation of the AI system 800 by preparing data for the AI model 830. As shown, the data layer 802 can include two sub-layers: a hardware platform 810 and one or more software libraries 812. The hardware platform 810 can be designed to perform operations for the AI model 830 and include computing resources for storage, memory, logic, and networking, such as the resources described in relation to FIG. 9. The hardware platform 810 can process amounts of data using one or more servers. The servers can perform backend operations such as matrix calculations, parallel calculations, machine learning (ML) training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electronic circuits that were originally designed for graphics manipulation and output but can be used for AI applications due to their vast computing and memory resources. GPUs use a parallel structure that generally makes their processing more efficient than that of CPUs. In some instances, the hardware platform 810 can include Infrastructure as a Service (IaaS) resources, which are computing resources, (e.g., servers, memory, etc.) offered by a cloud services provider. The hardware platform 810 can also include computer memory for storing data about the AI model 830, application of the AI model 830, and training data for the AI model 830. The computer memory can be a form of random-access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages, such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include Intel Math Kernel Library, Nvidia cuDNN, Eigen, and Open BLAS.

The structure layer 804 can include a machine learning (ML) framework 814 and an algorithm 816. The ML framework 814 can be thought of as an interface, library, or tool that allows users to build and deploy the AI model 830. The ML framework 814 can include an open-source library, an application programming interface (API), a gradient-boosting library, an ensemble method, and/or a deep learning toolkit that work with the layers of the AI system facilitate development of the AI model 830. For example, the ML framework 814 can distribute processes for application or training of the AI model 830 across multiple resources in the hardware platform 810. The ML framework 814 can also include a set of pre-built components that have the functionality to implement and train the AI model 830 and allow users to use pre-built functions and classes to construct and train the AI model 830. Thus, the ML framework 814 can be used to facilitate data engineering, development, hyperparameter tuning, testing, and training for the AI model 830.

Examples of ML frameworks 814 or libraries that can be used in the AI system 800 include TensorFlow, PyTorch, Scikit-Learn, Keras, and Caffe. Random Forest is a machine learning algorithm that can be used within the ML frameworks 814. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some implementations, the ML framework 814 performs deep learning (also known as deep structured learning or hierarchical learning) directly on the input data to learn data representations, as opposed to using task-specific algorithms. In deep learning, no explicit feature extraction is performed; the features of the feature vector are implicitly extracted by the AI system 800. For example, the ML framework 814 can use a cascade of multiple layers of nonlinear processing units for implicit feature extraction and transformation. Each successive layer uses the output from the previous layer as input. The AI model 830 can thus learn in supervised (e.g., classification) and/or unsupervised (e.g., pattern analysis) modes. The AI model 830 can learn multiple levels of representations that correspond to different levels of abstraction, wherein the different levels form a hierarchy of concepts. In this manner, AI model 830 can be configured to differentiate features of interest from background features.

The algorithm 816 can be an organized set of computer-executable operations used to generate output data from a set of input data and can be described using pseudocode. The algorithm 816 can include complex code that allows the computing resources to learn from new input data and create new/modified outputs based on what was learned. In some implementations, the algorithm 816 can build the AI model 830 through being trained while running computing resources of the hardware platform 810. This training allows the algorithm 816 to make predictions or decisions without being explicitly programmed to do so. Once trained, the algorithm 816 can run at the computing resources as part of the AI model 830 to make predictions or decisions, improve computing resource performance, or perform tasks. The algorithm 816 can be trained using supervised learning, unsupervised learning, semi-supervised learning, and/or reinforcement learning.

Using supervised learning, the algorithm 816 can be trained to learn patterns (e.g., map input data to output data) based on labeled training data. The training data can be labeled by an external user or operator. For instance, a user can collect a set of training data, such as by capturing data from microphones and/or other audio sensors, textual user inputs, motion data captured through videos and/or images, and the like (detailed further in FIGS. 3-7). In an example implementation, training data can include data received from the devices detailed in FIGS. 3 and 4 (e.g., devices with microphones, imaging capabilities, and/or video capabilities). The user can label the training data based on one or more classes and trains the AI model 830 by inputting the training data to the algorithm 816. The algorithm determines how to label the new data based on the labeled training data. The user can facilitate collection, labeling, and/or input via the ML framework 814. In some instances, the user can convert the training data to a set of feature vectors for input to the algorithm 816. Once trained, the user can test the algorithm 816 on new data to determine if the algorithm 816 is predicting accurate labels for the new data. For example, the user can use cross-validation methods to test the accuracy of the algorithm 816 and retrain the algorithm 816 on new training data if the results of the cross-validation are below an accuracy threshold.

Supervised learning can involve classification and/or regression. Classification techniques involve teaching the algorithm 816 to identify a category of new observations based on training data and are used when input data for the algorithm 816 is discrete. Said differently, when learning through classification techniques, the algorithm 816 receives training data labeled with categories (e.g., classes) and determines how features observed in the training data (e.g., features of data of FIGS. 3-7 such as acoustic properties, expressive features, textual syntactic and semantic structures, motion trajectories, motion orientations) relate to the categories (e.g., services and applications). Once trained, the algorithm 816 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 816 is continuous. Regression techniques can be used to train the algorithm 816 to predict or forecast relationships between variables. To train the algorithm 816 using regression techniques, a user can select a regression method for estimating the parameters of the model. The user collects and labels training data that is input to the algorithm 816 such that the algorithm 816 is trained to understand the relationship between data features and the dependent variable(s). Once trained, the algorithm 816 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 816 learns patterns from unlabeled training data. In particular, the algorithm 816 is trained to learn hidden patterns and insights of input data, which can be used for data exploration or for generating new data. Here, the algorithm 816 does not have a predefined output, unlike the labels output when the algorithm 816 is trained using supervised learning. Another way unsupervised learning is used to train the algorithm 816 to find an underlying structure of a set of data is to group the data according to similarities and represent that set of data in a compressed format. The relay system 300 disclosed herein can use unsupervised learning to identify patterns in data received from the devices detailed in FIGS. 3 and 4 (e.g., devices with microphones, imaging capabilities, and/or video capabilities) (e.g., to identify contextual features), and so forth. In some implementations, performance of the relay system 300 using unsupervised learning is improved by improving the verbalization, gesture, and/or text input provided to the computer system of the device, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 816 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 816 can be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 816 include factor analysis, item response theory, latent profile analysis, and latent class analysis.

In some implementations, the AI system 800 trains the algorithm 816 of AI model 830, based on the training data, to correlate the feature vector to expected outputs in the training data. As part of the training of the AI model 830, the AI system 800 forms a training set of features and training labels by identifying a positive training set of features that have been determined to have a desired property in question, and, in some implementations, forms a negative training set of features that lack the property in question. The AI system 800 applies ML framework 814 to train the AI model 830, that when applied to the feature vector, outputs indications of whether the feature vector has an associated desired property or properties, such as a probability that the feature vector has a particular Boolean property, or an estimated value of a scalar property. The AI system 800 can further apply dimensionality reduction (e.g., via linear discriminant analysis (LDA), PCA, or the like) to reduce the amount of data in the feature vector to a smaller, more representative set of data.

The model layer 806 implements the AI model 830 using data from the data layer and the algorithm 816 and ML framework 814 from the structure layer 804, thus enabling decision-making capabilities of the AI system 800. The model layer 806 includes a model structure 820, model parameters 822, a loss function engine 824, an optimizer 826, and a regularization engine 828.

The model structure 820 describes the architecture of the AI model 830 of the AI system 800. The model structure 820 defines the complexity of the pattern/relationship that the AI model 830 expresses. Examples of structures that can be used as the model structure 820 include decision trees, support vector machines, regression analyses, Bayesian networks, Gaussian processes, genetic algorithms, and artificial neural networks (or, simply, neural networks). The model structure 820 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 820 can include one or more hidden layers of nodes between the input and output layers. The model structure 820 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 822 represent the relationships learned during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural networks, such that the weights determine the strength of the nodes and the biases determine the thresholds for the activation functions of each node. The model parameters 822, in conjunction with the activation functions of the nodes, determine how input data is transformed into desired outputs. The model parameters 822 can be determined and/or altered during training of the algorithm 816.

The loss function engine 824 can determine a loss function, which is a metric used to evaluate the AI model's 830 performance during training. For instance, the loss function engine 824 can measure the difference between a predicted output of the AI model 830 and the actual output of the AI model 830 and is used to guide optimization of the AI model 830 during training to minimize the loss function. The loss function can be presented via the ML framework 814, such that a user can determine whether to retrain or otherwise alter the algorithm 816 if the loss function is over a threshold. In some instances, the algorithm 816 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model 830. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 826 used can be determined based on the type of model structure 820 and the size of data and the computing resources available in the data layer 802.

The regularization engine 828 executes regularization operations. Regularization is a technique that prevents over- and under-fitting of the AI model 830. Overfitting occurs when the algorithm 816 is overly complex and too adapted to the training data, which can result in poor performance of the AI model 830. Underfitting occurs when the algorithm 816 is unable to recognize even basic patterns from the training data such that it cannot perform well on training data or on validation data. The regularization engine 828 can apply one or more regularization techniques to fit the algorithm 816 to the training data properly, which helps constraint the resulting AI model 830 and improves its ability for generalized application. Examples of regularization techniques include lasso (L1) regularization, ridge (L2) regularization, and elastic (L1 and L2 regularization).

In some implementations, the AI system 800 can include a feature extraction module implemented using components of the example computer system 900 illustrated and described in more detail with reference to FIG. 9. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 830 by using this reduced representation. In some example implementations, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

Computer System

Figure 9:
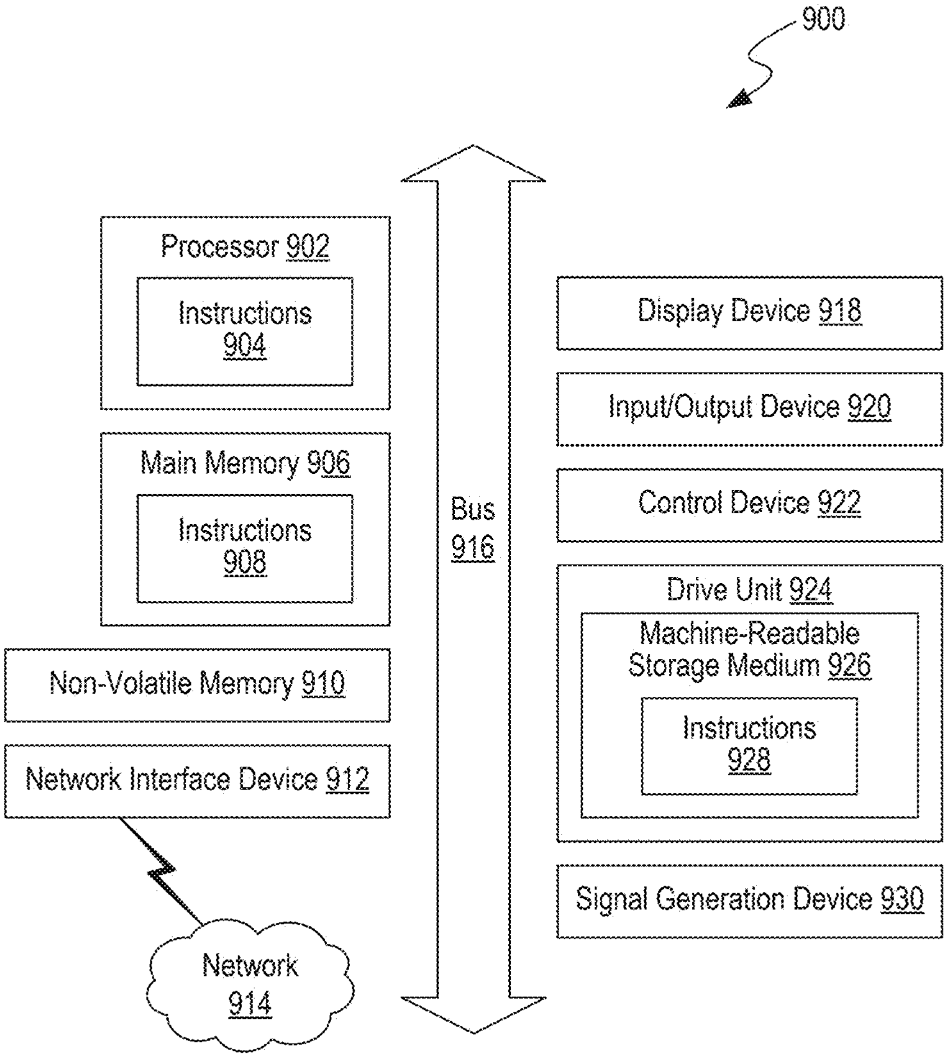
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example" and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions when executed by at least one data processor of a computer system, cause the computer system to:
- receive input from a first device,
  - wherein the input has a particular context;
- in response to receiving the input, extract features from the input;
- upscale the input based on the extracted features,
  - wherein the upscaled input amplifies one or more attributes of the input corresponding to the extracted features of the input, and
  - wherein the one or more attributes include at least one of: a gesture, a voice modulation, or a prosody change;
- transcribe the upscaled input to a text translation based on the particular context of the received input,
  - wherein the text translation maintains contextual relevance to the received input;
- modify the text translation to satisfy predetermined language guidelines based at least in part on established language standards;
- generate synthesized speech of the modified text translation based on the features in the received input,
  - wherein the features cause the synthesized speech to emulate identifiable emotions in the input;
- present the synthesized speech via a speaker of the first device; and
- cause transmission of the synthesized speech to a second device associated with a second user during a bidirectional communication session between a first user associated with the first device and the second user.

2. The non-transitory, computer-readable storage medium of claim 1, wherein the input includes at least one of: gestures, sign language, speech, augmented reality (AR) inputs, virtual reality (VR) inputs, smartwatch inputs, and vocalizations.

3. The non-transitory, computer-readable storage medium of claim 1, wherein the instructions to extract the features cause the computer system to:
- receive an additional input on the first device,
  - wherein the additional input is used to adjust at least one of the features,
  - wherein the features describe acoustic properties of the input, and
  - wherein the acoustic properties include at least one of: pitch, duration, timbre, formants, tempo, zero-crossing rate, spectral flux, spectral centroid, or mel-frequency cepstral coefficients (MFCCs).

4. The non-transitory, computer-readable storage medium of claim 1, wherein the features include expressive parameters,
- wherein the expressive parameters are cues for the identifiable emotions in the input, and
- wherein the expressive parameters include at least one of: intonation, pitch, tempo, volume, or prosody.

5. The non-transitory, computer-readable storage medium of claim 1, wherein the instructions to extract the features cause the computer system to:
- provide, using a deep learning model, the features based on patterns identified within the input,
  - wherein the deep learning model is iteratively refined using previous inputs.

6. The non-transitory, computer-readable storage medium of claim 1, wherein the instructions to present the synthesized speech cause the computer system to:
- provide a confidence score based on the synthesized speech to the first device,
  - wherein the confidence score represents a quality of the synthesized speech, and
  - wherein the first device is configured to receive user feedback related to the confidence score.

7. The non-transitory, computer-readable storage medium of claim 1, wherein the instructions cause the computer system to:
- receive user feedback from the first device,
  - wherein the user feedback relates to deviations between the generated synthesized speech and desired synthesized speech; and
- iteratively adjust the features to modify the generated synthesized speech and the desired synthesized speech.

8. A system comprising:
- at least one hardware processor; and
- at least one non-transitory memory storing instructions, which, when executed by the at least one hardware processor, cause the system to:
  - receive, using a microphone, an audio input from a first audio device, wherein the audio input has a particular context;
  - in response to receiving the audio input, transmit the audio input to a first transformation module, wherein the first transformation module is configured to:
    - extract features from the audio input,
      - wherein the features describe acoustic properties of the audio input, and
    - upscale the input to generate an upscaled audio input by amplifying one or more attributes of the input corresponding to the extracted features of the audio input, wherein the one or more attributes include at least one of: a gesture, a voice modulation, or a prosody change;

transmit the upscaled audio input to a second transformation module configured to transcribe the upscaled audio input to a text translation based on the particular context of the received audio input;

receive the text translation from the second transformation module;

modify the text translation to satisfy predetermined language guidelines based at least in part on established language standards;

generate synthesized speech of the modified text translation;

present the synthesized speech via a speaker of the first audio device; and cause transmission of the synthesized speech to a second audio device associated with a second audio user during a communication session between a first user associated with the first audio device and the second user.

9. The system of claim 8, wherein the instructions to extract the features cause the system to:

receive a user input on the first audio device, wherein the user input adjusts at least one of the features.

10. The system of claim 8, wherein generating the synthesized speech is directed by the features in the received audio input, and wherein the features cause the synthesized speech to emulate identifiable emotions in the audio input.

11. The system of claim 8, wherein the features include expressive parameters, wherein the expressive parameters are cues for identifiable emotions in the audio input, and wherein the expressive parameters include at least one or more of: intonation, pitch, tempo, volume, or prosody.

12. The system of claim 8, wherein the instructions to extract the features cause the system to:

provide, using a deep learning model, the features based on patterns identified within the audio input, wherein the deep learning model is iteratively refined using previous audio inputs.

13. The system of claim 8, wherein the instructions to present the synthesized speech cause the system to:

display a confidence score of the synthesized speech to the first audio device, wherein the confidence score is configured to represent a quality of the synthesized speech, and wherein the first audio device is configured to receive user feedback for the confidence score.

14. The system of claim 8, wherein the instructions cause the system to:

receive user feedback from the first audio device, wherein the user feedback relates to deviations between the generated synthesized speech and desired synthesized speech; and iteratively adjust the features to modify the generated synthesized speech and the desired synthesized speech.

15. A method comprising:

receiving an input from a first device, wherein the input has a particular context;

in response to receiving the input, extracting features from the input, wherein the features describe acoustic properties of the input;

upscaling the input based on the extracted features, wherein the upscaled input amplifies one or more attributes of the input corresponding to the extracted features of the input, and wherein the one or more attributes include at least one of: a gesture, a voice modulation, or a prosody change;

transcribing the upscaled input to a text translation based on the particular context of the received input, wherein the text translation maintains contextual relevance of the received input;

modifying the text translation to satisfy predetermined language guidelines based at least in part on established language standards;

generating synthesized speech from the modified text translation based on the features in the received input, and wherein the features cause the synthesized speech to emulate identifiable emotions in the input;

presenting the synthesized speech via a speaker of the first device; and cause transmission of the synthesized speech to a second device associated with a second user during a communication session between a first user associated with the first device and the second user.

16. The method of claim 15, extracting the features comprising:

receiving additional input on the first device, wherein the additional input is used to adjust at least one of the features, wherein the features describe acoustic properties of the input, and wherein the acoustic properties include at least one of: pitch, duration, timbre, formants, tempo, zero-crossing rate, spectral flux, spectral centroid, or mel-frequency cepstral coefficients (MFCCs).

17. The method of claim 15, wherein the features include expressive parameters, wherein the input is an audio input, wherein the expressive parameters are cues for the identifiable emotions in the input, and wherein the expressive parameters include at least one or more of: intonation, pitch, tempo, volume, or prosody.

18. The method of claim 15, wherein extracting the features comprises:

receiving additional input on the first device, wherein the additional input adjusts at least one of the features.

19. The method of claim 15, comprising:

receiving user feedback from the first device, wherein the user feedback relates to deviations between the generated synthesized speech and desired synthesized speech; and iteratively adjusting the features to modify the generated synthesized speech and the desired synthesized speech.

20. The method of claim 15, wherein at least a portion of the extracted features are derived from gesture data captured by one or more sensors during the communication session.

* * * * *